(12) United States Patent
Zhang

(10) Patent No.: US 12,738,569 B2
(45) Date of Patent: Sep. 15, 2026

(54) BATTERY PACK THERMAL ENERGY MANAGEMENT ASSEMBLY AND THERMAL ENERGY MANAGEMENT METHOD

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 741 days.

(21) Appl. No.: 18/306,663

(22) Filed: Apr. 25, 2023

(65) Prior Publication Data

US 2024/0363927 A1 Oct. 31, 2024

(51) Int. Cl.

*H01M 10/658* (2014.01)
*B60L 50/64* (2019.01)
*H01M 10/613* (2014.01)
*H01M 10/625* (2014.01)
*H01M 50/204* (2021.01)
*H01M 50/289* (2021.01)

(52) U.S. Cl.

CPC ........... *H01M 10/658* (2015.04); *B60L 50/64* (2019.02); *H01M 10/613* (2015.04); *H01M 10/625* (2015.04); *H01M 50/204* (2021.01); *H01M 50/289* (2021.01); *H01M 2220/20* (2013.01)

(58) Field of Classification Search

CPC ........................ H01M 10/6555; H01M 50/383
See application file for complete search history.

(56) References Cited

U.S. PATENT DOCUMENTS 5,354,630 A * 10/1994 Earl ...................... H01M 10/64 429/154
8,541,126 B2 9/2013 Hermann et al.
2011/0097614 A1* 4/2011 Kim .................... H01M 10/613 429/120
2017/0294693 A1* 10/2017 Tong ................. H01M 10/6556
2018/0323413 A1 11/2018 Nicholls
2021/0257690 A1* 8/2021 Kilhenny ................ B32B 25/04
2022/0181715 A1 6/2022 Jiang et al.
2022/0200079 A1 6/2022 Boddakayala et al.
2023/0299416 A1* 9/2023 Lee ..................... H01M 50/291 429/156

FOREIGN PATENT DOCUMENTS

WO 2022090575 5/2022
WO WO-2023108279 A1 * 6/2023 ............ H01M 10/66

* cited by examiner

*Primary Examiner* — Maria Laios
(74) *Attorney, Agent, or Firm* — David B. Kelley; Carlson, Gaskey & Olds, P.C.

(57) ABSTRACT

In some aspects, the techniques described herein relate to a battery pack assembly including a first battery cell group, a second battery cell group, and a multilayered shield disposed along a cell stack axis with the first battery cell group and the second battery cell group. The multilayered shield has an inner layer sandwiched between a first outer layer and a second outer layer. The multilayered shield includes a divider portion disposed axially between the first and second battery cell groups and a folded portion that is folded over the first battery cell group in a first axial direction to axially overlap with an area of the first battery cell group.

20 Claims, 4 Drawing Sheets

66
78
54
70
P1
62
66
74
58

P2
B
82
$H_S$
$T_A$

BATTERY PACK THERMAL ENERGY MANAGEMENT ASSEMBLY AND THERMAL ENERGY MANAGEMENT METHOD

TECHNICAL FIELD

This disclosure relates generally to managing thermal energy and vented gases within a battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to a battery pack assembly, including: a first battery cell group; a second battery cell group; and a multilayered shield disposed along a cell stack axis with the first battery cell group and the second battery cell group, the multilayered shield having an inner layer sandwiched between a first outer layer and a second outer layer, the multilayered shield including a divider portion disposed axially between the first and second battery cell groups and a folded portion that is folded over the first battery cell group in a first axial direction to axially overlap with an area of the first battery cell group.

In some aspects, the techniques described herein relate to a battery pack assembly, wherein the multilayered shield is a first multilayered shield, and further including a second multilayered shield, the first battery cell group disposed axially between the divider portion of the first multilayered shield and a divider portion of the second multilayered shield, a folded portion of the second multilayered shield folded over the first battery cell group in a second axial direction opposite the first axial direction.

In some aspects, the techniques described herein relate to a battery pack assembly, wherein the folded portion of the first multilayered shield and the folded portion of the second multilayered shield are spaced from the first battery cell group to provide an open area between the first battery cell group and the first and second multilayered shields.

In some aspects, the techniques described herein relate to a battery pack assembly, wherein the second outer layers in the folded portions of the first multilayered shield and the second multilayered shield directly contacts a thermal interface material that is sandwiched between the second outer layers and a portion of a battery pack enclosure.

In some aspects, the techniques described herein relate to a battery pack assembly, wherein the first outer layers in the folded portions of the first multilayered shield and the second multilayered shield separate the open area from another open area established between the battery pack enclosure and the first outer layers.

In some aspects, the techniques described herein relate to a battery pack assembly, wherein the portion of the battery pack enclosure is a second of a battery pack enclosure cover.

In some aspects, the techniques described herein relate to a battery pack assembly, wherein the folded portion of the first multilayered shield and the folded portion of the second multilayered shield span over at least one vent of the first battery cell group.

In some aspects, the techniques described herein relate to a battery pack assembly, wherein the folded portion of the first multilayered shield and the folded portion of the second multilayered shield contact each other.

In some aspects, the techniques described herein relate to a battery pack assembly, wherein the first outer layer in the folded portion of the first multilayered shield contacts the first outer layer in the folded portion of the second multilayered shield.

In some aspects, the techniques described herein relate to a battery pack assembly, further including a third multilayered shield, the third multilayered shield having a divider portion directly axially adjacent to the divider portion of the first multilayered shield, the third multilayered shield having a folded portion folded over the second battery cell group in the second axial direction.

In some aspects, the techniques described herein relate to a battery pack assembly, wherein the first and second outer layers are a metal or metal alloy.

In some aspects, the techniques described herein relate to a battery pack assembly, wherein the second outer layer in the folded portion directly contacts a thermal interface material that is sandwiched between the second outer layer and an area of a battery pack enclosure.

In some aspects, the techniques described herein relate to a battery pack assembly, wherein a height of the multilayered shield prior to folding over the folded portion is nominally equal to a height of a battery cell within the first group of battery cells plus two times a thickness of the battery cell plus a thickness of the inner layer.

In some aspects, the techniques described herein relate to a battery pack assembly, wherein the first battery cell group and the second battery cell group each includes at least one battery cell.

In some aspects, the techniques described herein relate to a battery pack assembly, wherein the first battery cell group, the multilayered shield, and the second battery cell group are constituents of a cell stack within a traction battery pack.

In some aspects, the techniques described herein relate to a method of managing thermal energy within a battery pack, including: establishing a divider portion and a folded portion within a multilayered shield; and positioning the multilayer shield such that the divider portion is between a first group of battery cells and a second group of battery cells along a cell stack axis such the folded portion axially overlaps with an area of the first group of battery cells.

In some aspects, the techniques described herein relate to a method, wherein the multilayered shield is a first multilayered shield, and further including establishing a divider portion and a folded portion within a second multilayered shield, and positioning the divider portion of the second multilayered shield along the cell stack axis such that the first group of battery cells is axially between the divider portion of the first multilayered shield and the divider portion of the second multilayered shield.

In some aspects, the techniques described herein relate to a method, wherein, after the positionings, the folded portion of the second multilayered shield extends over the first group of battery cells to contact the folded portion of the second multilayered shield.

In some aspects, the techniques described herein relate to a method, further including sandwiching a thermal interface material between the folded portion and an area of a battery pack enclosure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details traction battery pack assemblies having cell stacks with groups of one or more battery cells separated from each other by a multilayered shield. The multilayered shield extends radially from a cell stack axis beyond the battery cells. A folded portion of the multilayered shield extends over venting areas of the battery cells to, among other things, block vent gases from impinging on a battery pack enclosure.

Figure 1:
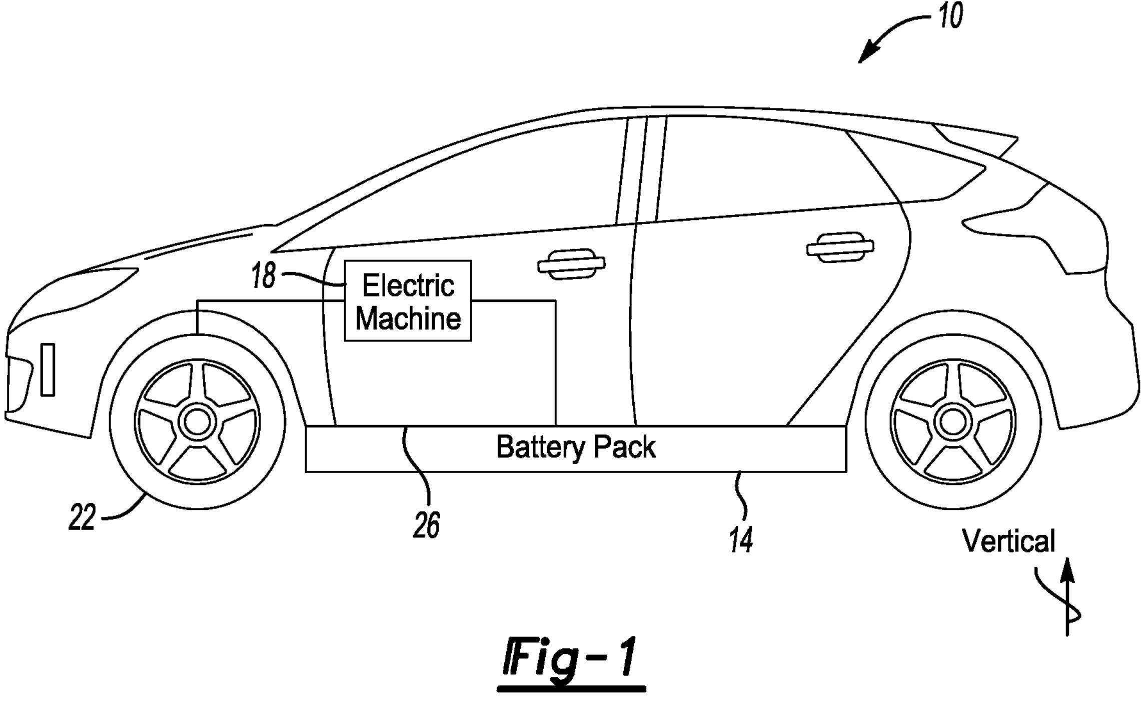
FIG. 1 illustrates a side view of an electrified vehicle having a traction battery pack.

With reference to FIG. 1, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery.

The traction battery pack assembly 14 is, in the exemplary embodiment, secured to an underbody 26 of the electrified vehicle 10. The traction battery pack assembly 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
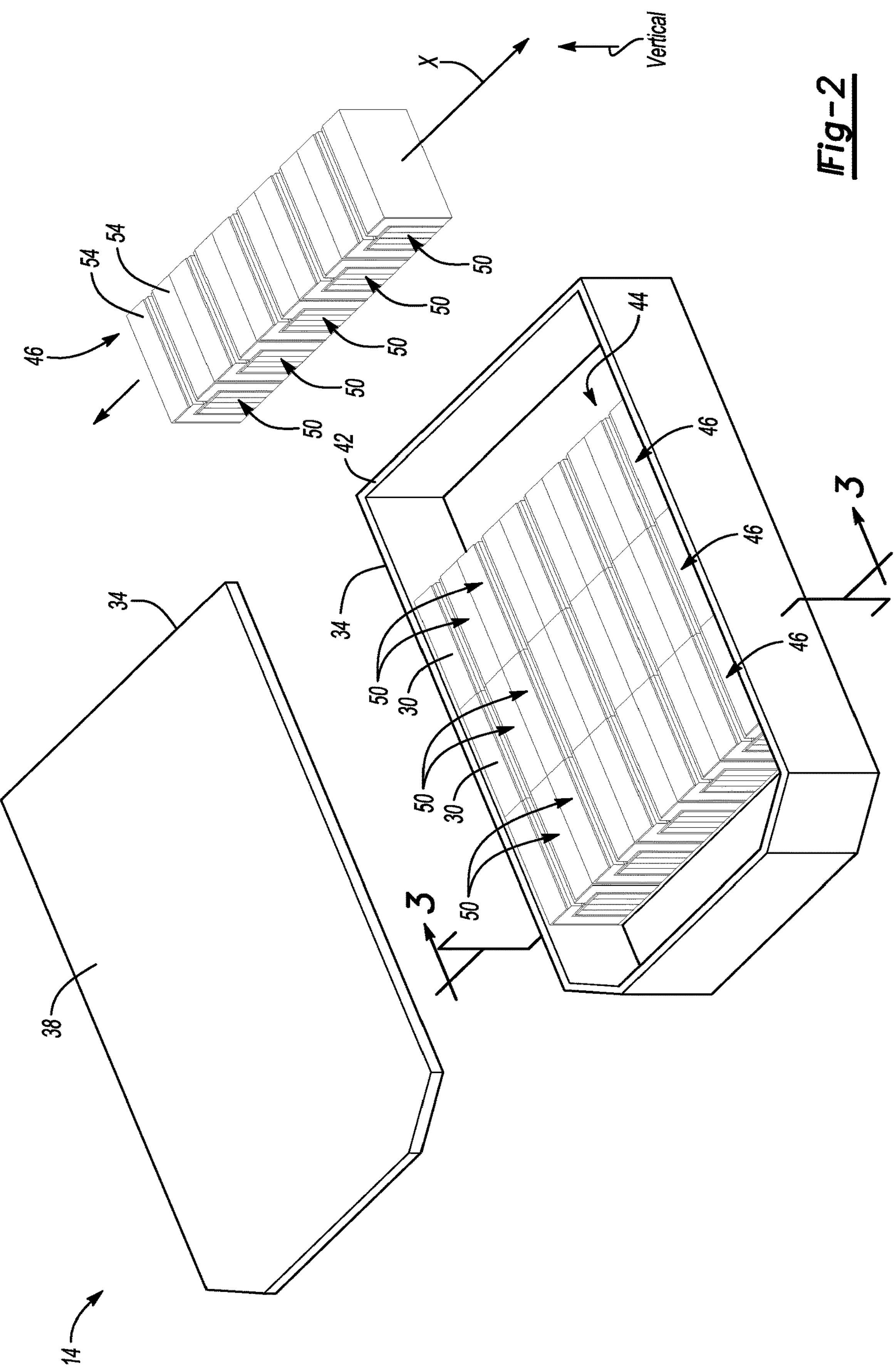
FIG. 2 illustrates an expanded perspective view of the traction battery pack of FIG. 1 according to an exemplary aspect of the present disclosure.
Figure 3:
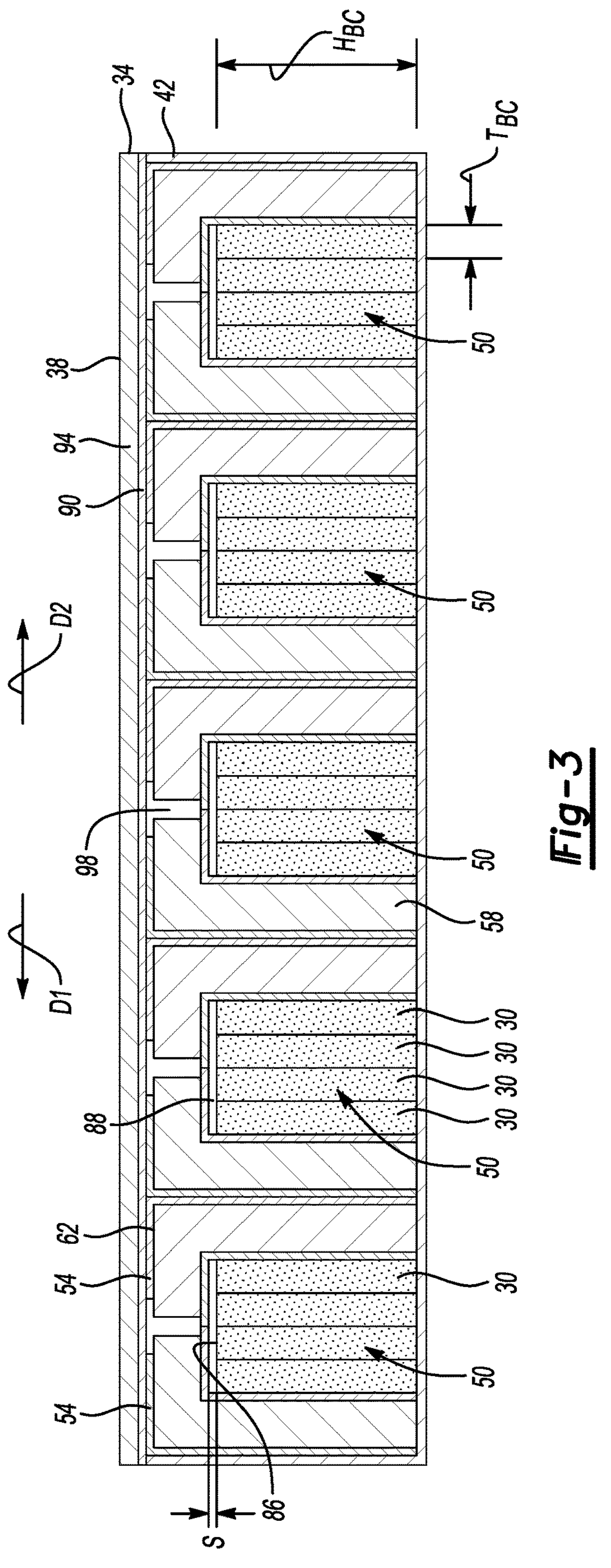
FIG. 3 illustrates a section view taken at line 3-3 in FIG. 2.

With reference now to FIGS. 2 and 3, the traction battery pack assembly 14 includes a plurality of battery cells 30 held within an enclosure assembly 34. In the exemplary embodiment, the enclosure assembly 34 includes an enclosure cover 38 and an enclosure tray 42. The enclosure cover 38 is secured to the enclosure tray 42 to provide an interior area 44 that houses the plurality of battery cells 30.

The plurality of battery cells (or simply, "cells") 30 are for supplying electrical power to various components of the electrified vehicle 10. The battery cells 30 are stacked side-by-side relative to one another as part of a cell stack 46. The battery pack 14 includes four cell stacks 46 within the interior area 44 of the enclosure assembly 34.

Although a specific number of battery cells 30 and cells stacks 46 are illustrated in the various figures of this disclosure, the traction battery pack assembly 14 could include any number of cells 30 and cell stacks 46. In other words, this disclosure is not limited to the specific configuration of cells 30 and cell stacks 46 shown in FIGS. 2 and 3.

In this example, the battery cells 30 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

Within the cell stacks 46, the battery cells 30 are arranged in groups 50 separated from each other by one or more multilayered shields 54. In this example, the battery cell groups 50 include four individual battery cells 30. In other examples, the battery cell groups 50 could include more than four or fewer than four battery cells-even one battery cell 30 in some examples.

Figures 4, 5:
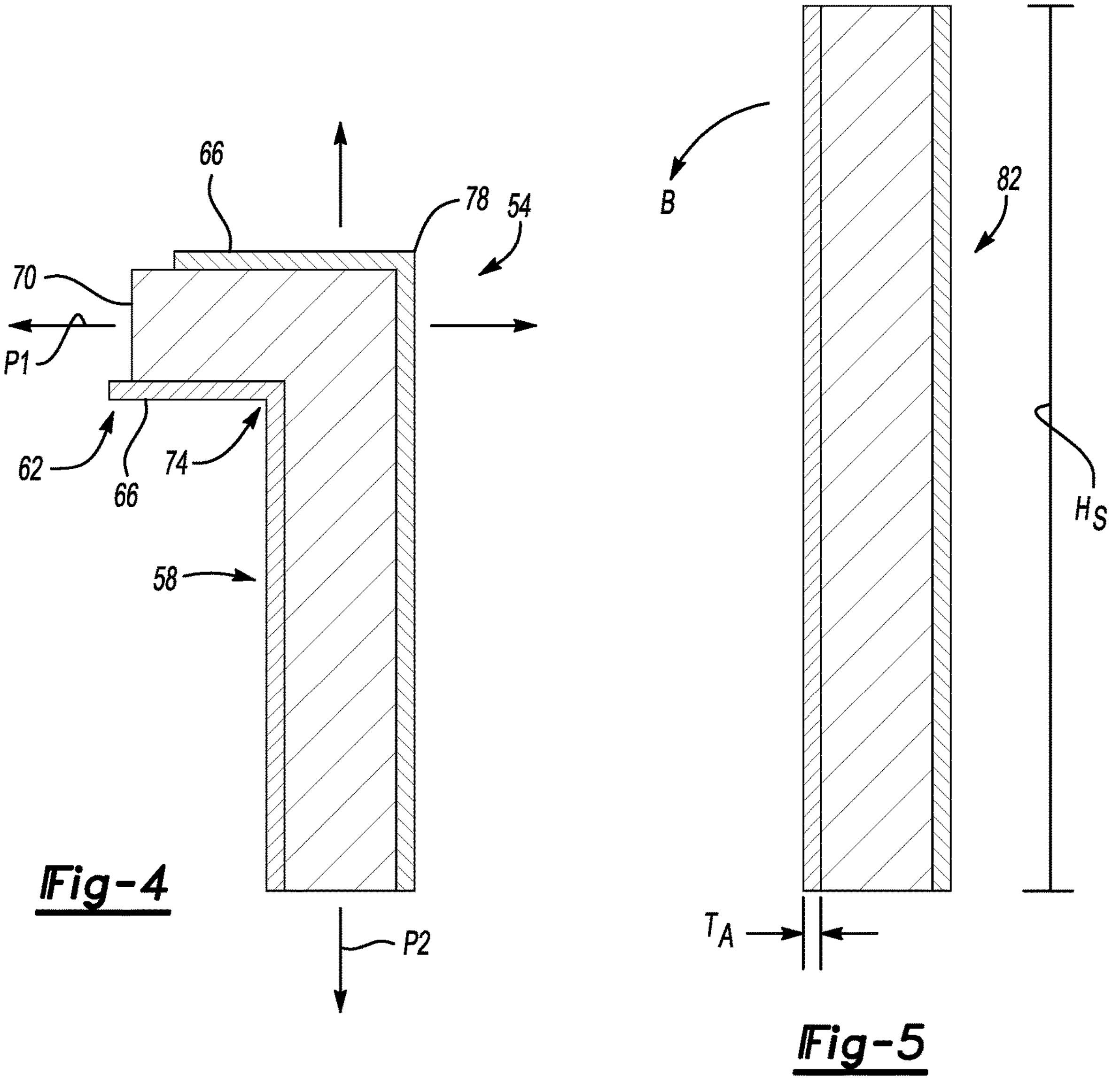
FIG. 4 illustrates the multilayered shield from the cell stack of FIG. 3 having a folded portion and a divider portion.
FIG. 5 illustrates a multilayered sheet prior to folding the sheet to establish the multilayered shield of FIG. 4.

With reference now to FIG. 4 and continued references to FIGS. 2 and 3, the multilayered shields 54 each includes a divider portion 58 and a folded portion 62. In this example, the folded portion 62 is oriented within a first plane P1 and the divider portion 58 is oriented within a second plane P2 that is ninety degrees offset from the first plane P1.

Within the cell stacks 46, the divider portions 58 are disposed axially between the battery cell groups 50 and at the opposing ends of the cell stack 46. The folded portions 62 of the multilayered shields 54 are each folded over at least a portion of one of the battery cell groups 50 to axially overlap with an area of that battery cell group 50.

the example multilayered shields 54 each include a pair of outer layers 66 sandwiching an inner layer 70. The outer layers 66 can be a metal or metal alloy. The inner layer 70 can be an insulative material, such as an aerogel material. One of the outer layers 66 provides an inside corner 74 of the multilayered shield 54. The other outer layer 66 provides an outside corner 78 of the multilayered shield 54.

The multilayered shield 54 is formed from a planar multilayered sheet 82 as shown in FIG. 5. Tooling can be used to bend an area of the multilayered sheet 82 in the direction B from the position of FIG. 4 to the position of FIG. 5, which establishes the folded portion 62 of the multilayered shield 54 separate from the divider portion 58.

During assembly of the cell stacks 46, the multilayered shield 54 is positioned within the cell stack 46 such that the divider portion 58 is positioned axially between a first one of the cell groups 50 and a second one of the cell groups 50. The example folded portion 62 then extends axially in a first axial direction D1 to axially overlap with an area of the first one of the cell groups 50.

Another multilayered shield 54 can then be positioned on an opposite side of the first one of cell groups. The folded portion 62 of the other multilayered shield 54 extends axially in a second direction D2 that is opposite the first direction D1. The folded portion 62 of the other multilayered shield 54 axially overlaps with another portion of the first one of the cell groups 50. The folded portions 62 of the two multilayered shields 54 can contact each other.

In particular, the outer layers 66 that establish the inside corners 74 of the multilayered shields 54 contact each other. The outer layers 66 that contact each other can be connected to each other using an adhesive, but that is not required. The outer layers 66 that establish the outside corners 78 are spaced a distance from each other as shown.

The folded portions 62 are spaced a distance S from an outboard side 86 of the cells 30 in the first battery cell group 50. In this example, battery cells 30 of the first battery cell group 50 vent through these outboard sides 86. The venting can be in response to a thermal event.

The folded portions 62 of the multilayered shield 54 span over these outboard sides 86 can block vented gas from impinging directly on an area of the enclosure assembly 34. The vented gas is initially contained within an open area 88 that is between the cell groups 50 and the folded portions 62 of the multilayered shields 54. The vented gases can be communicated from the open area 88 out of the battery pack 14.

In this example, the outer layers 66 that establish the outside corners 78 of the multilayered shields 54 directly contact a thermal interface material 90 lining an interior surface 94 of the enclosure assembly 34. The thermal interface material 90 is sandwiched between the outer layers 66 that establish the outside corners 78 and this portion of the enclosure assembly 34.

In this example, the thermal interface material 90 lines the interior surface 94 of the enclosure cover 38. The contact between the outer layers 66 and the thermal interface material 90 can help to communicate thermal energy from the multilayered shields 54 through the thermal interface material 90 to the enclosure assembly 34.

The outer layers 66 that establish the outside corners 78 and the inner layers 70 are spaced from each other to provide a second open area 98.

In this example, a height $H_S$ of the planar multilayered sheet 82 is nominally equal to a height $H_{BC}$ of one of the battery cells 30, plus twice a thickness $T_{BC}$ of the battery cell 30, plus a thickness $T_A$ of the inner layer 70.

An exemplary method of managing thermal energy within the battery pack of FIG. 2 can include establishing the divider portion 58 and the folded portion 62 within the multilayered sheet 82 to provide the multilayered shield 54 shown in FIG. 4. The method then includes positioning that multilayered shield 54 within the cell stack 46 such that the divider portion 58 is between a battery cell groups 50 the cell stack axis. When positioned, the folded portion 62 axially overlaps with an area of one of the battery cell groups 50. The folded portion 62 n can extend over a vent of the battery cells 30 to block vented gas from impinging directly on an area of the enclosure assembly 34.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack assembly, comprising:

a first battery cell group;

a second battery cell group; and a multilayered shield disposed along a cell stack axis with the first battery cell group and the second battery cell group, the multilayered shield having an inner layer sandwiched between a first outer layer and a second outer layer, the multilayered shield including a divider portion disposed axially between the first and second battery cell groups and a folded portion that is folded over the first battery cell group in a first axial direction to axially overlap with an area of the first battery cell group, wherein the inner layer extends continuously from the divider portion into the folded portion, and wherein the folded portion includes a horizontal leg formed by the inner layer extending axially over the first battery cell group and a vertical leg formed by the first and second outer layers depending from the horizontal leg alongside the first battery cell group.

2. The battery pack assembly of claim 1, wherein the multilayered shield is a first multilayered shield, and further comprising a second multilayered shield, the first battery cell group disposed axially between the divider portion of the first multilayered shield and a divider portion of the second multilayered shield, a folded portion of the second multilayered shield folded over the first battery cell group in a second axial direction opposite the first axial direction.

3. The battery pack assembly of claim 2, wherein the folded portion of the first multilayered shield and the folded portion of the second multilayered shield are spaced from the first battery cell group to provide an open area between the first battery cell group and the first and second multilayered shields.

4. The battery pack assembly of claim 3, wherein the second outer layers in the folded portions of the first multilayered shield and the second multilayered shield directly contact a thermal interface material that is sandwiched between the second outer layers and a portion of a battery pack enclosure.

5. The battery pack assembly of claim 4, wherein the first outer layers in the folded portions of the first multilayered shield and the second multilayered shield separate the open area from another open area established between the battery pack enclosure and the first outer layers.

6. The battery pack assembly of claim 5, wherein the portion of the battery pack enclosure is a second part of a battery pack enclosure cover.

7. The battery pack assembly of claim 2, wherein the folded portion of the first multilayered shield and the folded portion of the second multilayered shield span over at least one vent of the first battery cell group.

8. The battery pack assembly of claim 2, wherein the folded portion of the first multilayered shield and the folded portion of the second multilayered shield contact each other.

9. The battery pack assembly of claim 2, wherein the first outer layers in the folded portions of the first and second multilayered shields establish inside corners that contact each other, and the first outer layers in the folded portions of the first and second multilayered shields establish outside corners that are spaced from each other.

10. The battery pack assembly of claim 2, further comprising a third multilayered shield, the third multilayered shield having a divider portion directly axially adjacent to the divider portion of the first multilayered shield, the third multilayered shield having a folded portion folded over the second battery cell group in the second axial direction.

11. The battery pack assembly of claim 1, wherein the first and second outer layers are a metal or metal alloy.

12. The battery pack assembly of claim 1, wherein the second outer layer in the folded portion directly contacts a thermal interface material that is sandwiched between the second outer layer and an area of a battery pack enclosure.

13. The battery pack assembly of claim 1, wherein a height of the multilayered shield prior to folding over the folded portion is nominally equal to a height of a battery cell within the first group of battery cells plus two times a thickness of the battery cell plus a thickness of the inner layer.

14. The battery pack assembly of claim 1, wherein the first battery cell group and the second battery cell group each include at least one battery cell.

15. The battery pack assembly of claim 1, wherein the first battery cell group, the multilayered shield, and the second battery cell group are constituents of a cell stack within a traction battery pack.

16. A method of managing thermal energy within a battery pack, comprising:

establishing a divider portion and a folded portion within a multilayered shield, wherein an inner layer of the multilayered shield extends continuously from the divider portion into the folded portion and forms a horizontal leg of the folded portion that extends axially over a first group of battery cells, and wherein first and second outer layers of the multilayered shield sandwiching the inner layer form a vertical leg of the folded portion alongside the first group of battery cells; and positioning the multilayered shield such that the divider portion is between a first group of battery cells and a second group of battery cells along a cell stack axis such that the folded portion axially overlaps with an area of the first group of battery cells.

17. The method of claim 16, wherein the multilayered shield is a first multilayered shield, and further comprising establishing a divider portion and a folded portion within a second multilayered shield, and positioning the divider portion of the second multilayered shield along the cell stack axis such that the first group of battery cells is axially between the divider portion of the first multilayered shield and the divider portion of the second multilayered shield.

18. The method of claim 17, wherein, after the positioning, the folded portion of the second multilayered shield extends over the first group of battery cells to contact the folded portion of the first multilayered shield.

19. The method of claim 16, further comprising sandwiching a thermal interface material between the folded portion and an area of a battery pack enclosure.

20. A battery pack assembly, comprising:

a cell stack including a first group of battery cells and a second group of battery cells arranged along a cell stack axis;

a first multilayered shield and a second multilayered shield, each multilayered shield having an inner layer sandwiched between a first outer layer and a second outer layer;

each of the first and second multilayered shields including a divider portion and a folded portion, the divider portions of the first and second multilayered shields disposed on axially opposite sides of the first group of battery cells along the cell stack axis, the folded portions of the first and second multilayered shields each extending axially inward over the first group of battery cells from a respective one of the divider portions; and wherein the folded portion of each multilayered shield includes a horizontal leg formed by the inner layer extending axially over the first group of battery cells and a vertical leg formed by the first and second outer layers, the first outer layers of the folded portions of the first and second multilayered shields each defining an inside corner and an outside corner, the inside corners of the first and second multilayered shields contacting each other, and the outside corners of the first and second multilayered shields being spaced from each other.

* * * * *